Patented May 27, 1947

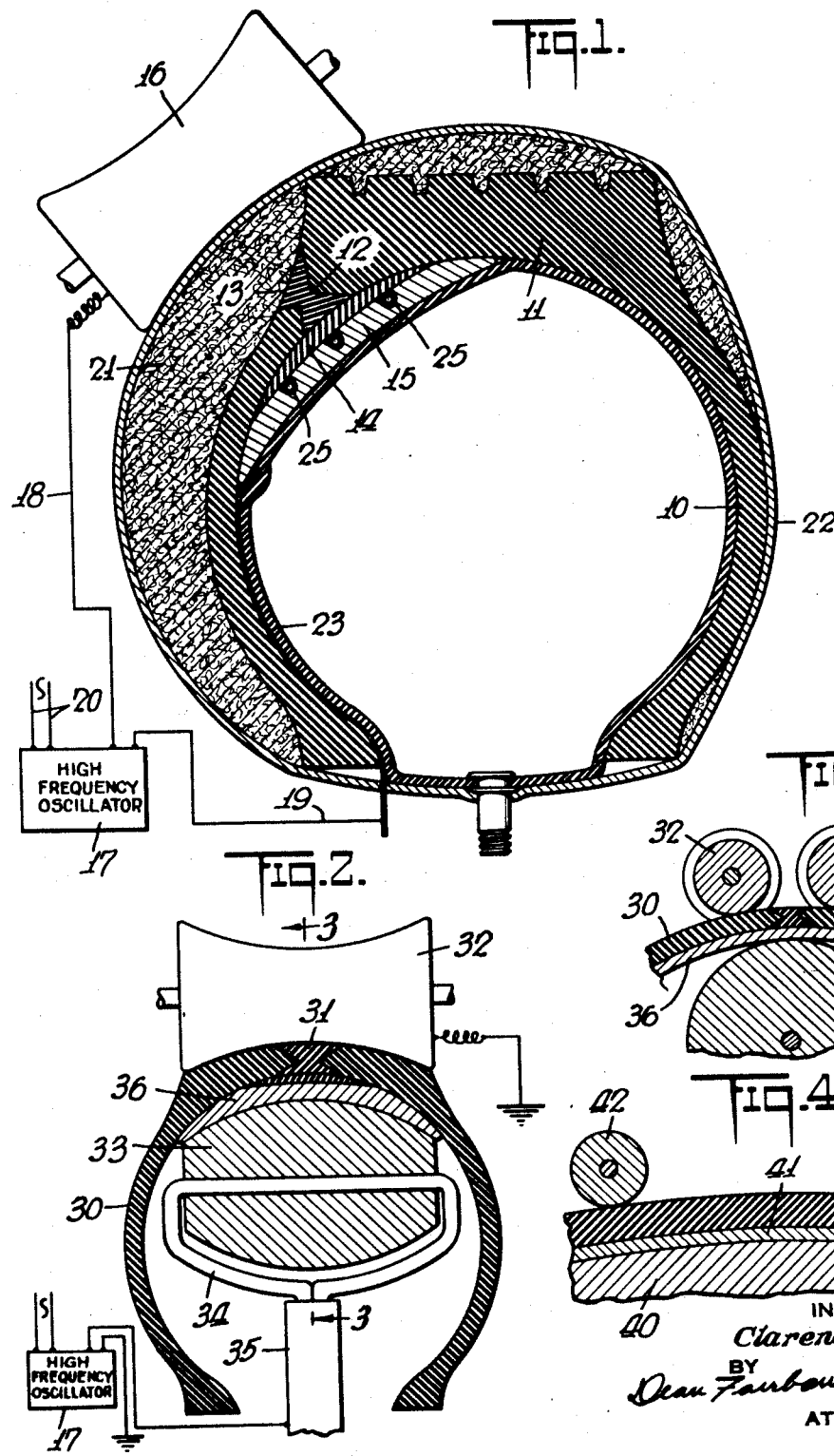

2,421,096

UNITED STATES PATENT OFFICE 2,421,096

PROCESS AND APPARATUS FOR REPAIRING TIRES

Clarence W. Vogt, Norwalk, Conn.

Application October 28, 1943, Serial No. 507,923

9 Claims. (Cl. 18—18)

This invention relates to the repair of pneumatic tires by vulcanization, and by the term "repair" is included patching at holes, cuts or weakened places, and recapping, such as by applying a strip or band along the tread.

In the procedures heretofore employed the portion of the tire which is to be repaired is buffed or otherwise treated so as to remove injured or deteriorated material, and to present a clean, dry surface. A bonding cement is then applied to the surface prior to the application of repair or recap material. A soft, uncured or precured rubber composition is applied and worked into place, and into snug engagement with said surface, to build up the tire to the desired shape and size, and to fill any hole or cut in the tire. Heat and pressure are then applied to vulcanize the uncured rubber and permanently unite it to the body of the tire.

The heat and pressure are ordinarily that of steam, and this requires the use of a steam boiler and heavy and cumbersome parts for enclosing the tire. Such apparatus is not readily portable, the piping and joints often leak, and considerable delay is often incurred in developing the required steam pressure.

Where heat is obtained by employment of either steam or electric resistance elements enclosed or imbedded in the molds, such molds require numerous forms or fillers or matrices. These only approximately conform to the variations in actual sizes and contours of tires of the same nominal sizes made by different manufacturers. Where an imperfectly fitted mold lining or matrix is used, the outside of the tire is distorted during the vulcanizing process, and such distortion usually causes an abnormally rapid tire wear during service. Furthermore, there is a "growth or stretch" in tires during use, and a tire which was originally 10 inches wide, or cross section, has been known to exceed 10½ inches after having been run several thousand miles.

With an impressed temperature of 290° to 300° F. on superficial repair area of a large truck tire, approximately fifty minutes is required in commercial repair molds for base of tread stock to reach 280° F. curing temperature. The superficial area is thus subjected for a long period to high temperature, a condition which is not helpful and may be harmful to the tire material.

The main object of my invention is to provide a simple apparatus in which newly applied patch or recapping material is brought to vulcanizing or curing temperature uniformly throughout its cross section, whereby the interior or center portion of such material is cured for as long a time interval as the outer surface.

A further object is to provide a simple, comparatively light and readily portable unit for effecting the vulcanizing, and in which there is no power consumption except during the actual heating and vulcanizing action.

A further object is to provide a simple apparatus by which the duration of the application of heat may be varied for different areas, and in accordance with the thickness or other character of the rubber to be vulcanized at such areas, so that a uniform degree of vulcanization is obtained.

In carrying out my invention I employ high frequency electrostatic heating, the electrodes being disposed on opposite sides of the part to be vulcanized, and I preferably make one or both of the electrodes in the form of a roller which may move along the tire to be vulcanized, and apply the required pressure thereto.

The unit employed for imparting to the electric current the desired frequency and other characteristics, may be of any well known type, such for instance as that on the market and known as "Thermex," and may be readily controlled to produce the degree of heat required.

In the accompanying drawings I have illustrated somewhat diagrammatically certain embodiments of my invention. In the drawings:

Fig. 1 is a transverse section through a portion of the tire with the repair apparatus applied thereto.

Fig. 2 is a view similar to Fig. 1, but showing a modified form of apparatus; and Figs. 3 and 4 are sections at right angles to the sections shown in Figs. 1 and 2, and showing other modifications of the apparatus.

In Fig. 1 I have shown a tire 10 having a tread portion 11 and a hole 12 which has been buffed, cut or otherwise enlarged to make it substantially hour-glass in section. This hole, after having been properly prepared in the conventional manner, is coated with rubber cement, and then filled by soft, uncured rubber composition 13, which is worked and pressed into place in the usual manner to fill the hole and restore it to its original shape and contour. Preferably a portion of the uncured rubber, with imbedded fabric plies, is applied along the inner surface of the tire as a backing patch 14.

In carrying out my invention, the uncured rubber so applied is vulcanized by high frequency electrostatic heating. Two electrodes are provided, one being in the form of a plate 15, preferably curved to approximately conform to the inner contour of the tire wall, and the other being in the form of a roller 16 disposed outside of the tire and having a curved surface which is substantially parallel to the outer surface of the plate 15. These two electrodes are connected to the opposite terminals of a high frequency oscillator which is shown as enclosed in a box 17 with wire connections 18 and 19 to the two electrodes and current supply wires 20 from a suitable source of alternating current. As the high frequency oscillator per se does not form any portion of my invention, and as such units are well known for high frequency electrostatic heating, the details of the oscillator are not illustrated. The oscillator should produce a frequency which may be from 1 to 50 megacycles, and the input should be from ½ to 10 kw., depending on the size of the tire and whether it is a spot repair, sectional repair, or full recap; but these factors may be selected in accordance with the heat and time required for the vulcanization.

It is important that the opposed surfaces of the two electrodes be substantially parallel, so that there will be a substantially uniform heating effect across the area between said surfaces. In order to obtain this uniform spacing and the proper application of pressure, it will in most cases be necessary to provide some filler, because the inner and outer surfaces of a tire are seldom parallel except on the sides near the beads, and it is seldom necessary to repair a tire in such areas.

As shown in Fig. 1, the filler 21 is applied on the exterior of the tire, and of such thickness that it will compensate for the variation in the thickness of the tire wall. Such filler should have substantially the same dielectric constant or property as the rubber to be vulcanized, and may be vulcanized finely divided scrap rubber, or may be rubber ground off or cut away in the preparing of other previous tires for repair. Such rubber pieces or particles may be mixed with a small amount of powdered talc to prevent any vulcanizing together of contacting surfaces, and thus permit repeated reuse. Other filler substances, such as sand, may be used.

To hold the filler material in solid, compact form, and under pressure, the tire may be tightly wrapped with a tape 22 applied in spiral, overlapped relationship, as in a puttee. For applying the internal pressure the ordinary inner tube 23 may be employed and inflated through the usual valve stem 24. The inflation of the tube, resisted by the outer casing or tape 22, will hold the plug or other repair parts in position, and will apply pressure on the exterior as well as the interior of such repair parts.

In the operation of vulcanizing, the tire after having been patched and encased as shown in Fig. 1, is vulcanized by the action of the high frequency electrostatic heat resulting from passing the proper current from one electrode to the other. During this vulcanizing the roller electrode 16 is moved back and forth with rolling contact on the casing 22, and the uncured rubber vulcanized progressively along the length of the tire. Obviously the hole in the tire may be a long cut, in which case the plug will extend along the full length of the cut, and the roller is moved back and forth through a range somewhat exceeding the length of the part to be vulcanized. The pressure applied by the compressed air in the inner tube 23 presses the tire against the roller, so that the uncured rubber is firmly pressed against the surfaces of the tire to which it is to be permanently attached by the vulcanizing action. The time required for the vulcanizing will vary with the kw. of the current employed and the spacing between the two electrodes; and the roller may be moved back and forth through its entire range, or may be moved back and forth through a portion only of the range, where greater heating is required, or where a larger amount of uncured rubber is to be vulcanized. The current applied may be varied during the operation and a higher heating effect produced at the beginning of the operation, so as to bring the tire and its patch up to vulcanizing temperature, after which the heat supply may be decreased.

In order that the degree of heat being employed may be readily determined, any suitable form of heat registering instruments may be used. I have illustrated the inner electrode 15 as having bulbs 25 welded to one surface and containing expansible fluid. These may be connected to pressure-sensitive indicators calibrated to read in temperature units so that the operator may at all times ascertain the temperature of the inner electrode, and therefore the temperature of the high frequency electrostatic field between the electrodes.

If the two electrodes are directly connected to the opposite terminals of the high frequency oscillator, it will of course be necessary to properly insulate the bearings of the roller 16. As later pointed out in connection with Fig. 2, the outer electrode 16 may be grounded, in which case the insulation is not required.

In Fig. 2 there is shown a tire 30 with a rounded tread and a hole in said tread, and after properly preparing and filling with a plug 31 and an inner layer or patch of uncured rubber. A roller 32 similar to the roller 16 of Fig. 1 is employed as the outer electrode, but the inner electrode 33 is also in the form of a roller. This roller is an idler mounted on a suitable bracket 34 on the inner end of a support 35. The surfaces of the two rollers in a plane through their axes are parallel, and in order that each may apply proper pressure to the wall of the tire, a filler pad 36 is employed. This may be in the form of a bag filled with any suitable material having substantially the same dielectric as the uncured rubber, and the pad may have flexible walls so that when the two rollers are pressed together it will conform to the curvature of the inner surface of the tire wall and the outer surface of the roller 33. The two rollers may have stationary axes and the inner roller serve to support the tire. The rolling action may be effected by moving the tire back and forth between the rollers. The weight of the tire will cause the desired pressure of the inner roller 33 and pad 36 against the inner wall of the tire, while the outer roller 32 may be pressed down in any suitable way, or may be of sufficient weight so that it will exert the desired pressure.

The construction here illustrated may be employed for various different sizes of tires, as the pressure may act to flatten out the portion of the tire wall between the two rollers and to the curvature determined by the surfaces of said rollers. In this construction the inner electrode is shown as connected to one terminal of the high frequency oscillator, while the other terminal and the outer roller 32 are grounded.

In some cases it may be desired to employ two outer electrodes in the form of rollers. In Fig. 3 there are shown two of the rollers 32 and a single inner roller 33. Where a plurality of outer rollers are employed it is preferably that these two move back and forth over the tire, so as to act alternately in pressing the tire wall against the inner roller.

Various other means may be employed for supporting or applying pressure to the inner surface of the tire wall. Instead of employing an inflatable inner tube, as shown in Fig. 1, the entire space within the section of the tire to be repaired may be packed tightly with a filler such as sand, cotton linters, or other material. This need not be of the same dielectric as the rubber, as it is not between the two electrodes.

In Fig. 4 I have shown somewhat diagrammatically a section through a portion of a tire wall with such filler material 40 within the tire, and holding an electrode 41 in position against the inner surface.

Where a plurality of rollers are used, as shown in Fig. 3, the potential on the two outer rollers should be substantially the same, in order to prevent any short-circuiting between them, and thus they may be placed close together. If one roller is to be employed merely for pre-heating and the other for the main vulcanizing action, the two outer rollers may be connected to different terminals of the high frequency oscillator, or to different oscillators. In such case the rollers 42 and 43, as shown in Fig. 4, should be sufficiently far apart to prevent any arcing or current flow between them. This distance should considerably exceed the distance between either roller and the inner electrode.

The foregoing are merely a few examples of ways in which the present invention may be carried out. It will be seen that one or both of the electrodes may be in the form of a roller, and both electrodes may be directly connected to the high frequency oscillator, or one may be grounded. Where a stationary electrode in the form of a plate is employed, it should be larger than the patch or other area to be vulcanized. It is important that the surfaces of the two electrodes, and between which the heating field is formed, should be parallel. The rolling action of one electrode may be effected either by moving the electrode along the tire or by moving the tire past the electrode. A wide variety of means may be employed within the tire for resisting pressure applied by the outer roller or for creating pressure against the outer roller. By varying the shape and thickness of the filler, a relatively small number of electrodes may be all that are necessary for a wide variation in the size and shape of the tire, the contour of the outer surface of the tire wall, and various locations of the area where the repair is needed on said wall.

It is not necessary to provide any chamber within which the tire or a section thereof is enclosed, and the apparatus parts for supporting and applying the heat and pressure to the tire are simple, comparatively light, and readily transportable. The unit for converting the ordinary electric current of a lighting system to that having the desired frequency and kw. is likewise readily transportable, and may be used wherever electric current is available. The apparatus does not consume any energy except when the circuit is closed and the actual heating and vulcanizing action is being produced, and no time interval is necessary to develop the required heat, as in the case of firing a boiler and bringing the steam to the required pressure. The heating effect between the electrodes is dependent solely upon the characteristics of the current and the spacing of the electrodes, and is entirely independent of the pressure which is applied to the tire during the actual vulcanizing action.

The apparatus, particularly that shown in Figs. 2, 3 and 4, may be used for vulcanizing a band or strip of uncured rubber along the periphery of the tire to recap or retread the tire, instead of merely repairing a hole, cut, or other injury to the side wall or tread.

Where a strip or so-called "camelback" is applied to form a new tread, a roller having flanges or ridges may be rolled over the strip after it is applied to form the desired pattern for an anti-skid surface, and the depressions or grooves then filled with talc or other removable non-vulcanizable material before the outer roller or rollers are applied for heating. The arrangement of rollers is particularly useful where the applied vulcanizable material is of a character which does not give off gases during the curing, as for instance, certain synthetic rubbers, and where sustained pressure is not required.

Having thus described my invention, what I claim as new and desire to secure by Letters Patent is:

1. An apparatus for repairing tires with uncured rubber, which includes an electrode adapted to be disposed within the tire, and having a surface approximately parallel to the inner surface of the tire, an electrode in the form of a roller, and adapted to be disposed outside of the tire, said roller and the tire being relatively movable to cause rolling of the roller over the area of said uncured rubber, and means connected to said electrodes for establishing a high frequency electrostatic field between said electrodes to heat cure said uncured rubber.

2. An apparatus for repairing tires by heat curing uncured rubber in the area to be repaired, said apparatus including an electrode in the form of a curved plate adapted to be disposed within the tire, a second electrode in the form of a roller for rolling action on the outer surface of the tire, and a high frequency oscillator connected to said electrodes for producing between said electrodes a high frequency electrostatic heating field.

3. An apparatus for repairing tires by heat curing uncured rubber in the area to be repaired, said apparatus including an electrode in the form of a curved plate adapted to be disposed within the tire, a second electrode in the form of a roller for applying rolling pressure to the outer surface of the tire, filler material on one surface of the tire wall for building up the effective thickness of the wall and filler to a substantially uniform dimension, and a high frequency oscillator connected to said electrodes for producing between said electrodes a high frequency electrostatic heating field.

4. An apparatus for repairing tires by heat curing uncured rubber in the area to be repaired, said apparatus including an electrode adapted to be disposed within the tire and a plurality of spaced electrodes adapted for rolling action at the outer side of the tire, and a high frequency oscillator connected to said electrodes for producing between the electrode on the inside of the tire and the electrodes on the outside of the tire a high frequency electrostatic heating field.

5. In combination a tire having a section to be repaired by the vulcanization of uncured rubber in said section, filler material on one surface of the tire wall at said section and presenting an outer surface substantially parallel to the opposed surface of said wall, a non-expansible flexible casing enclosing said tire and filler material, an electrode in the form of a curved plate within said tire, an electrode in the form of a roller for engaging the outer surface of said casing and having a surface substantially parallel to the outer surface of said plate, means for forcing said plate outwardly toward said roller to apply pressure on the area to be vulcanized, and means connected to said electrodes for producing a high frequency electrostatic heating field between said electrodes.

6. The process of repairing a tire, which includes applying uncured rubber in the area to be repaired, applying to one face of the tire wall a dielectric filler presenting an outer surface substantially parallel to the opposite face of the tire wall, holding the tire wall and filler under pressure between a pair of electrodes, one of said electrodes being in the form of a roller, having a contour substantially parallel to said latter tire wall face, and to the opposed side of the other electrode and disposed in pressure applying position with respect to said tire wall, moving said roller back and forth with respect to said tire wall, and developing a high frequency electrostatic field between said electrodes.

7. The process of repairing a tire, which includes applying uncured rubber in the area to be repaired, supporting an electrode adjacent to and parallel with the inner surface of the tire wall, holding said tire wall under pressure, and moving a pair of rotatable electrodes along the outer surface of the tire wall, said electrodes being spaced apart to a distance greater than that between either roller and the inner electrode, and developing a high frequency electrostatic field between said rollers and said inner electrode.

8. The process of repairing a tire, which includes applying uncured rubber in the area to be repaired, supporting a plate-like electrode within the tire, encasing said tire in a flexible, substantially non-stretchable casing, forcing the inner electrode outwardly to place the tire wall under compression, and moving a rotatable electrode back and forth along the outer surface of said casing and over the area to be repaired, and developing a high frequency electrostatic field between said electrodes.

9. An apparatus for repairing tires by vulcanizing uncured rubber in the area to be repaired, said apparatus including an electrode adapted to be disposed within the tire, an electrode in the form of a roller adapted to be disposed outside of said tire and movable along the tire in a circumferential direction, whereby the area to be repaired may be subjected to pressure between said electrodes, a body of deformable filler material adapted to be disposed between one of said electrodes and the tire and presenting a surface in conforming engagement with said last-mentioned electrode and substantially parallel to the surface of the other electrode facing said tire area, and a high frequency oscillator connected to said electrodes for producing between them a high frequency electrostatic heating field.

CLARENCE W. VOGT.

REFERENCES CITED

The following references are of record in the file of this patent:

UNITED STATES PATENTS

| Number | Name | Date |
|---|---|---|
| 1,162,397 | Price | Nov. 30, 1915 |
| 2,280,771 | Dufour et al. | Apr. 28, 1942 |
| 2,324,068 | Crandell | July 13, 1943 |
| 1,852,886 | Jones, Jr. | Apr. 5, 1932 |
| 1,216,654 | Burke | Feb. 20, 1917 |
| 1,354,754 | Huey | Oct. 5, 1920 |
| 1,579,641 | Burdette | Apr. 6, 1926 |
| 1,932,302 | Browne | Oct. 24, 1933 |
| 1,983,705 | Pilblad et al. | Dec. 11, 1934 |
| 2,341,617 | Hull | Feb. 15, 1944 |